US008163678B2

(12) United States Patent
Campbell et al.

(10) Patent No.: US 8,163,678 B2
(45) Date of Patent: *Apr. 24, 2012

(54) ENHANCED OIL RECOVERY SURFACTANT FORMULATION AND METHOD OF MAKING THE SAME

(75) Inventors: Curtis B. Campbell, Hercules, CA (US); Theresa A. Denslow, Concord, CA (US); Gabriel Prukop, Katy, TX (US); Varadarajan Dwarakanath, Houston, TX (US); Adam C. Jackson, League City, TX (US); Taimur Malik, Houston, TX (US); Tanmay Chaturvedi, Houston, TX (US)

(73) Assignees: Chevron U.S.A. Inc., San Ramon, CA (US); Chevron Oronite Company, LLC, San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/260,768

(22) Filed: Oct. 29, 2008

(65) Prior Publication Data

US 2009/0111717 A1   Apr. 30, 2009

Related U.S. Application Data

(60) Provisional application No. 60/983,759, filed on Oct. 30, 2007.

(51) Int. Cl.
C09K 8/524 (2006.01)
C09K 8/584 (2006.01)
E21B 43/00 (2006.01)
E21B 43/22 (2006.01)

(52) U.S. Cl. ........ 507/263; 507/252; 507/254; 507/256; 507/259; 166/270.1
(58) Field of Classification Search .................. 507/263, 507/252, 254, 256, 259; 166/270.1
See application file for complete search history.

(56) References Cited

U.S. PATENT DOCUMENTS

| 6,022,843 | A | 2/2000 | Shanks et al. |
| 7,183,452 | B2 | 2/2007 | Campbell et al. |
| 7,770,641 | B2 * | 8/2010 | Dwarakanath et al. .... 166/270.1 |
| 2005/0085397 | A1 | 4/2005 | Hou et al. |
| 2005/0199395 | A1 | 9/2005 | Berger et al. |
| 2005/0236300 | A1 * | 10/2005 | Twu et al. .................. 208/18 |
| 2006/0014650 | A1 | 1/2006 | Campbell et al. |

OTHER PUBLICATIONS

D. B. Levitt, et al., Identification and Evaluation of High-Performance Eor Surfactants, Society of Petroleum Engineers, 2006, 1-11.
Adam Jackson, Experimental Study of the Benefits of Sodium Carbonate on Surfactants For Enhanced Oil Recovery, MS Thesis, The University of Texas at Austin, 1-226, Dec. 2006.

* cited by examiner

Primary Examiner — Timothy J. Kugel
Assistant Examiner — Atnaf Admasu
(74) Attorney, Agent, or Firm — Josetta I. Jones; Carlton Virassammy

(57) ABSTRACT

The present invention is directed to an enhanced oil recovery formulation which comprises:
(a) an alkylaromatic sulfonate;
(b) an isomerized olefin sulfonate
(c) a solvent;
(d) a passivator; and
(e) a polymer.

22 Claims, No Drawings

ENHANCED OIL RECOVERY SURFACTANT FORMULATION AND METHOD OF MAKING THE SAME

This application claims priority from U.S. Provisional Application No. 60/983,759 filed on Oct. 30, 2007, the entire contents of which are incorporated herein by reference.

The present invention is directed to the recovery of oil from subterranean petroleum reservoirs, and more particularly, to an enhanced oil recovery surfactant formulation and a method of making the same. The present invention is also directed to a method for enhancing the recovery of oil from a subterranean reservoir which method employs the enhanced oil recovery surfactant formulation of the present invention.

BACKGROUND OF THE INVENTION

Crude oil production from oil in subterranean reservoirs may involve use of various flooding methods as the natural forces, which are used in the "primary recovery" process, become depleted. A large portion of the crude oil may have to be driven out of the formation in "secondary" or "tertiary" recovery processes. In addition, some reservoirs may not have sufficient natural forces for oil production even by primary recovery processes. The production of crude oil using such flooding methods is one example of enhanced oil recovery process.

Currently, the petroleum industry is re-evaluating technologies that will improve the ability to recover remaining and untapped oil from the subterranean reservoirs. Injecting a displacing fluid or gas may begin early, long before the complete depletion of the field by primary recovery processes. Methods for improving displacement efficiency or sweep efficiency may be used at the very beginning of the first injection of a displacing fluid or gas, rather than under secondary and tertiary recovery conditions.

The easiest method of flooding a subterranean reservoir for the production of crude oil is by injecting a liquid or a gas into the well to force the oil to the surface. Water flooding is the most widely used fluid. However, water does not readily displace oil because of the high interfacial tension between the two liquids which result in high capillary pressure that trap in porous media.

The addition of chemicals to modify the properties of the flooding liquid is well known in the art of improved/enhanced oil recovery. Surfactants are one class of chemical compounds that have been used in aqueous media for enhanced oil recovery. Surfactants have been found to effectively lower the interfacial tension between oil and water and enable mobilization of trapped oil through the reservoir.

Alkylaryl sulfonates have been used as surfactants for enhanced oil recovery. They have been used in surfactant flooding, alone, or in conjunction with co-surfactants and/or sacrificial agents. Alkylaryl sulfonates are generally used not only because they are able to lower the interfacial tension between oil and water, but also because when used in conjunction with varying amounts of other salts, such as, sodium chloride they exhibit desirable phase behavior. Depending on the molecular weight and molecular weight distribution, branching and point of attachment of the aryl group to the alkyl groups, alkylaryl sulfonates can be tailored to preferentially reside in the aqueous or oleic phases at different electrolyte concentrations, i.e., salinities. At low salinities the alkylayrl sulfonates reside in water and at high salinities they partition into the oil. In either case, the swollen micellar solutions that contain surfactants, oil and water are termed microemulsions. At optimal salinity an equal volume of oil and water are solubilized in the microemulsion. For well tailored and matched alkylaryl sulfonates, the high volumes of oil and water solubilized in the microemulsion result in ultra-low interfacial tensions that provide potential for high oil recovery from reservoirs.

The salinity of the water in subterranean hydrocarbon reservoirs may vary a great deal. For example, the Minas oil field in Indonesia has total dissolved salts of between 0.2 and 0.3 weight percent. Other reservoirs may have salinities as high as or higher than 2.0 percent sodium chloride and over 0.5 percent calcium chloride and magnesium chloride. It is desirable to optimize the alkylaryl sulfonates for surfactant flooding for enhanced oil recovery for a particular reservoir by evaluating tailored versions of the alkylaryl sulfonates with native reservoir brine and reservoir oil under ambient reservoir conditions via phase behavior experiments. In addition to the phase behavior experiments a few interfacial tension measurements are needed to verify that the interfacial tensions are acceptably low. In addition to testing the surfactants with native reservoir brines additional tests with injected solutions are needed as in some instances the injectate brine is different from native reservoir brines.

Generally, pure alkylaryl sulfonates, that is, those having a narrow range of molecular weights, are useful for recovery of light crude oils. Such alkylaryl sulfonates have exhibited poor phase behavior, i.e., poor potential to recover oils, containing high wax content. Oils with typically high wax content generally have high equivalent average carbon numbers (EACN's). The equivalent alkane carbon number (EACN) is a representation of an average carbon chain length of a hydrocarbon mixture. As an illustration, pentane, hexane and heptane have alkane carbon numbers of 5, 6 and 7 respectively. However a mixture containing 1 mole of pentane and one mole of hexane would have an EACN of 5.5. Field crude oils are complex mixtures but when interacting with surfactants, they behave as a single component fluid with an EACN that is a mole fraction average of its constituents.

Alkylaryl sulfonates having a broad spectrum of carbon chain lengths in the alkyl group are more desirable for use to recover waxy crude oils or crude oils with high equivalent average carbon numbers (EACN's). In addition to optimizing the molecular weight and/or molecular weight distribution of an alkylaryl sulfonate to maximize the amount of oil in the aforementioned micro-emulsion, the use of other components in combination with the alkylarylsulfonate, such as inorganic salts, co-solvents, polymeric materials and co-surfactants may improve phase behavior. The performance of an enhanced oil recovery formulation may also be measured by the oil solubilization parameter, which the volume of oil dissolved per unit volume of surfactant. The oil solubilization is inversely proportional to the interfacial tensions.

In addition the performance is also measure by the ability of the formulation to achieve stable microemulsions and low interfacial tensions rapidly, i.e., in less than one day in the laboratory.

A number of patents and patent applications have discussed methods for enhanced oil recovery using surfactant flooding. In addition to the use of surfactants, there are a number of patent and patent applications discussing the use of co-surfactants and sacrificial agents for enhanced oil recovery.

Hsu et al., U.S. Pat. No. 6,022,843 discloses an improved concentrated surfactant formulation and process for the recovery of residual oil from subterranean petroleum reservoirs, and more particularly an improved alkali surfactant flooding process which results in ultra-low interfacial tensions between the injected material and the residual oil, wherein the concentrated surfactant formulation is supplied at a concentration above, at, or, below its critical micelle concentration, also providing in situ formation of surface active material formed from the reaction of naturally occurring organic acidic components with the injected alkali material which serves to increase the efficiency of oil recovery.

Berger et al., U.S. Published Patent Application No. 2005/0199395A1 discloses an oil recovery process and a particular class of alkylaryl sulfonate surfactants. The surfactants are derived from an alpha-olefin stream having a broad distribution of even carbon number ranging from 12 to 28 or more.

A general treatise on enhanced oil recovery is *Basic Concepts in Enhanced Oil Recovery Processes* edited by M. Baviere (published for SCI by Elsevier Applied Science, London and New York, 1991).

SUMMARY OF THE INVENTION

The present invention is directed to an enhanced oil recovery surfactant formulation composed of a primary surfactant, a secondary co-surfactant, a co-solvent, a passivator and a polymer. The present invention is also directed to a method for enhancing the recovery of oil from a subterranean reservoir which method employs said formulation of the present invention.

In one embodiment, the present invention is directed to an enhanced oil recovery formulation comprising
(a) a primary surfactant comprising an alkylaromatic moiety having the general formula:

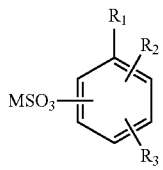

wherein $R_1$ is hydrogen or an alkyl group containing from about 1 to 3 carbon atoms; $R_2$ is hydrogen or an alkyl group having from about 1 to 3 carbon atoms; $R_3$ is an alkyl group having from about 8 to about 60 carbon atoms and M is a mono-valent cation;
(b) a secondary co-surfactant having the general formula:

wherein $R_4$ is an aliphatic hydrocarbyl group having from about 12 to about 40 carbon atoms, and having from about 20 to 98 weight percent branching, and containing one or more olefin or alcohol moieties or mixtures thereof, and X is mono-valent cation;
(c) a solvent;
(d) a passivator; and
(e) a polymer.

In one embodiment, the present invention is directed to a method of making an enhanced oil recovery formulation comprising mixing
(a) a primary surfactant comprising an alkylaromatic moiety having the general formula:

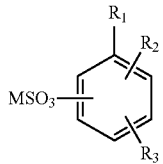

wherein $R_1$ is hydrogen or an alkyl group containing from about 1 to 3 carbon atoms; $R_2$ is hydrogen or an alkyl group having 1 carbon atom; $R_3$ is an alkyl group having from about 8 to about 60 carbon atoms; and M is a mono-valent cation;

(b) a secondary co-surfactant having the general formula:

wherein $R_4$ is an aliphatic hydrocarbyl group having from about 12 to about 40 carbon atoms, and having from about 20 to 98 weight percent branching, and containing one or more olefin or alcohol moieties or mixtures thereof; and X is a mono-valent cation;
(c) a solvent;
(d) a passivator; and
(e) a polymer.

DETAILED DESCRIPTION OF THE INVENTION

Definitions

As used herein, the following terms have the following meanings unless expressly stated to the contrary:

The term "primary surfactant" as used herein refers to the anionic aromatic surfactant that is present in the formulation.

The term "co-surfactant" as used herein refers to the anionic non-aromatic surfactant that is present in the formulation.

The terms "active" or "actives" as used herein refers to the concentration of the sodium salts of each surfactant species (i.e., primary surfactant or co-surfactant).

The term "alkylate" as used herein refers to the alkylaromatic compound used to prepare the alkylaromatic sulfonates of the present invention. The alkylaromatic compound was prepared using an aromatic compound and linear alpha olefin or isomerized olefin.

The term "isomerized alpha olefin (IAO)" as used herein refers to an alpha olefin that has been subjected to isomerization conditions which results in an alteration of the distribution of the olefin species present and/or the introduction of branching along the alkyl chain. The isomerized olefin product may be obtained by isomerizing a linear alpha olefin containing from about 12 to about 40 carbon atoms, and more preferably from about 20 to about 28 carbon atoms.

The term "alkali metal" as used herein refers to Group IA metals of the Periodic Table.

The term "co-solvent" as used herein refers to alcohols, ethers and/or a range of nonionic materials. Generally these nonionic materials have a somewhat higher tolerance to polyvalent ions, are water-soluble and may also provide a reduction in viscosity of the surfactant formulation.

The term "passivator" as used herein refers to alkali metal carbonate, bicarbonate or hydroxide salts.

The terms "enhanced oil recovery" or "EOR" as used herein refer to processes for enhancing the recovery of hydrocarbons from subterranean reservoirs.

The terms "Gas Chromatography" or "GC" as used herein refer to Gas Liquid Phase Chromatography.

The term oil solubilization parameter "SPo" refers to the volume of oil dissolved per unit volume of surfactant. Typically, oil solubilization parameter is measure via phase behavior experiments.

The terms "interfacial tension" or "IFT" as used herein refer to the surface tension between test oil and water of different salinities containing a surfactant formulation at different concentrations. Typically, interfacial tensions are measured using a spinning drop tensiometer or calculated from phase behavior experiments.

The term "Middle Phase" refers to the micro-emulsion formed by combining test oil and the reservoir brine containing the surfactant formulation during phase behavior testing.

The term "2-alkyl attachment" refers to attachment of the alkyl group on the aromatic ring wherein the longest alkyl chain is attached to the aromatic ring at the 2-position on the alkyl chain.

Unless otherwise specified, all percentages are in weight percent and the pressure is in atmospheres.

The present invention is directed to an enhanced oil recovery surfactant formulation comprising a primary surfactant, a co-surfactant, a solvent, a polymer and a passivator and a method of making the enhanced oil recovery surfactant formulation.

The Primary Surfactant

The primary surfactant of the present invention has the general formula:

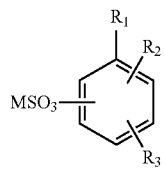

wherein $R_1$ is hydrogen or an alkyl group containing from about 1 to 3 carbon atoms; $R_2$ is hydrogen or an alkyl group having from about 1 to 3 carbon atoms; $R_3$ is an alkyl group having from about 8 to about 60 carbon atoms, and M is a mono-valent cation. In one embodiment, M is an alkali metal, ammonium, or substituted ammonium.

Examples of substituted ammonium include ammonium independently substituted with from about 1 to about 4 aliphatic or aromatic hydrocarbyl groups having from about 1 to about 15 carbon atoms, such as alkyl, aryl, alkaryl and aralkyl, and optionally having one or more heteroatoms, such as nitrogen, oxygen or sulfur, which may be present in aliphatic or aromatic heterocyclic rings. Examples of suitable heterocyclic ring substituents include pyrrole, pyrrolidine, pyridine, pyrimidine, pyrazole, imidazole and quinoline. The heterocyclic ring substituent may be substituted on the ammonium moiety through a carbon atom in the heterocyclic ring, such as in a C-pyridyl-substituted ammonium, or, alternatively, the quaternary ammonium nitrogen itself may be a nitrogen atom in the heterocyclic ring, such as in a pyridinium ion.

In one embodiment, $R_1$ and $R_2$ are methyl and the alkylaromatic moiety is alkylxylene. More preferably, the alkylxylene moiety is alkyl-ortho-xylene.

In another embodiment the alkylaromatic moiety is alkyl-meta-xylene.

The primary surfactant employed in the present invention is an alkylaromatic sulfonate salt obtained by the alkylation of an aromatic compound. Preferably, the aromatic compound is benzene, toluene, xylene, mixtures thereof or the like. More preferred, aromatic compound is toluene, xylene, or mixtures thereof. If xylene is employed, the xylene compound may comprise ortho-, meta-, or para-xylene, or mixtures thereof.

Typically, the aromatic compound is alkylated with a mixture of normal alpha olefins (NAO's) containing from $C_8$-$C_{60}$ carbon atoms, preferably $C_{10}$-$C_{50}$ carbon atoms, and most preferred from $C_{12}$-$C_{40}$ carbon atoms to yield an aromatic alkylate. The alkylate is sulfonated to form an alkylaromatic sulfonic acid which is then neutralized with caustic thereby producing a sodium alkylaromatic sulfonate compound. The most preferred alkylate is made by the alkylation of ortho-xylene which produces an alkylate containing several isomers, but in which at least 90 wt. % of the alkylate is the 1,3,4-ring attachment structure, having 40 to 60 wt % 2-alkyl attachment to the aromatic ring (i.e., wherein the longest alkyl chain is attached to the aromatic ring at the 2-position on the alkyl chain), preferably 45-55 wt % 2-alkyl attachment and more preferred about 50 wt % 2-alkyl attachment to the aromatic ring. Preferably, the alkylate will contain from 1 to 20 wt % dialkylate species and more preferably less than 10 wt % dialkylate species. Preferably, at least about 95 wt % and most preferred 98 wt % of the alkylate contains the 1,3,4-ring attachment structure. Upon sulfonation of the alkylate, a mixture of alkylaromatic sulfonic acid isomers are formed and the preferred isomer is the 2-alkyl-4,5-dimethyl benzene sulfonic acid isomer where the amount of this sulfonic acid isomer is present, preferably, in an amount of from about 1 to about 90 wt %, more preferably in an amount of from about 10 to about 80 wt % and most preferably in amount of at least about 70 wt %.

Aromatic Compound

At least one aromatic compound or a mixture of aromatic compounds may be used for the alkylation reaction in the present invention. Preferably the at least one aromatic compound or the aromatic compound mixture comprises at least one of monocyclic aromatics, such as benzene, toluene, xylene, cumene or mixtures thereof. More preferably, the at least one aromatic compound or aromatic compound mixture is xylene, including all isomers (i.e., meta-, ortho- and para-), and mixtures thereof. Most preferably, the at least one aromatic compound is ortho-xylene.

Sources of Aromatic Compound

The at least one aromatic compound or the mixture of aromatic compounds employed in the present invention is commercially available or may be prepared by methods that are well known in the art.

Olefins

The olefins employed to make the primary surfactant of the present invention may be derived from a variety of sources. Such sources include the normal alpha olefins, linear alpha olefins, isomerized linear alpha olefins, dimerized and oligomerized olefins, and olefins derived from olefin metathesis. Another source from which the olefins may be derived is through cracking of petroleum or Fischer-Tropsch wax. The Fischer-Tropsch wax may be hydrotreated prior to cracking. Other commercial sources include olefins derived from paraffin dehydrogenation and oligomerization of ethylene and other olefins, methanol-to-olefin processes (methanol cracker) and the like.

In one embodiment, the aromatic compound may be alkylated with a mixture of normal alpha olefins (NAO's) containing from $C_8$-$C_{60}$ carbon atoms, preferably from $C_{10}$-$C_{50}$ carbon atoms and more preferred from $C_{12}$-$C_{40}$ carbon atoms to yield the primary surfactant alkylate.

Sources of Olefins

The normal alpha olefins employed to make the primary surfactant in the present invention are commercially available or may be prepared by methods that are well known in the art.

The olefins employed in this invention may be linear, isomerized linear, branched or partially branched. The olefin may be a single carbon number olefin, or it may be a mixture of linear olefins, a mixture of isomerized linear olefins, a mixture of branched olefins, a mixture of partially branched olefins, or a mixture of any of the foregoing.

The olefins may selected from olefins with carbon numbers ranging from about 8 carbon atoms to about 60 carbon atoms. Preferably, the olefins are selected from olefins with carbon numbers ranging from about 10 to about 50 carbon atoms, more preferred from about 12 to about 40 carbon atoms.

In another embodiment, the olefin or the mixture of olefins is selected from linear alpha olefins or isomerized olefins containing from about 8 to about 60 carbon atoms. More preferably, the mixture of olefins is selected from linear alpha olefins or isomerized olefins containing from about 10 to about 50 carbon atoms. Most preferably, the mixture of olefins is selected from linear alpha olefins or isomerized olefins containing from about 12 to about 40 carbon atoms.

The mixture of branched olefins is preferably selected from polyolefins which may be derived from $C_3$ or higher monoolefins (i.e., propylene oligomers, butylenes oligomers, or co-oligomers etc.). Preferably, the mixture of branched olefins is either propylene oligomers or butylenes oligomers or mixtures thereof.

Preferably, the linear olefins that may be used for the alkylation reaction may be one or a mixture of normal alpha olefins selected from olefins having from about 8 to about 60 carbon atoms per molecule. More preferably, the normal alpha olefin is selected from olefins having from about 10 to about 50 carbon atoms per molecule. Most preferably, the normal alpha olefin is selected from olefins having from about 12 to about 40 carbon atoms per molecule.

In one embodiment of the present invention, the normal alpha olefins are isomerized using a solid or a liquid acid catalyst. A solid catalyst preferably has at least one metal oxide and an average pore size of less than 5.5 angstroms. More preferably, the solid catalyst is a molecular sieve with a one-dimensional pore system, such as SM-3, MAPO-11, SAPO-11, SSZ-32, ZSM-23, MAPO-39, SAPO-39, ZSM-22 or SSZ-20. Other possible acidic solid catalysts useful for isomerization include ZSM-35, SUZ-4, NU-23, NU-87 and natural or synthetic ferrierites. These molecular sieves are well known in the art and are discussed in Rosemarie Szostak's Handbook of Molecular Sieves (New York, Van Nostrand Reinhold, 1992) which is herein incorporated by reference for all purposes. A liquid type of isomerization catalyst that can be used is iron pentacarbonyl ($Fe(CO)_5$).

The process for isomerization of normal alpha olefins may be carried out in batch or continuous mode. The process temperatures may range from about 50° C. to about 250° C. In the batch mode, a typical method used is a stirred autoclave or glass flask, which may be heated to the desired reaction temperature. A continuous process is most efficiently carried out in a fixed bed process. Space rates in a fixed bed process can range from 0.1 to 10 or more weight hourly space velocity.

In a fixed bed process, the isomerization catalyst is charged to the reactor and activated or dried at a temperature of at least 125° C. under vacuum or flowing inert, dry gas. After activation, the temperature of the isomerization catalyst is adjusted to the desired reaction temperature and a flow of the olefin is introduced into the reactor. The reactor effluent containing the partially-branched, isomerized olefins is collected. The resulting partially-branched, isomerized olefins contain a different olefin distribution (i.e., alpha olefin, beta olefin; internal olefin, tri-substituted olefin, and vinylidene olefin) and branching content than that of the unisomerized olefin and conditions are selected in order to obtain the desired olefin distribution and the degree of branching.

Acid Catalyst

Typically, the alkylated aromatic compound may be prepared using a Bronsted acid catalyst, a Lewis acid catalyst, or solid acidic catalysts.

The Bronsted acid catalyst may be selected from a group comprising hydrochloric acid, hydrofluoric acid, hydrobromic acid, sulfuric acid, perchloric acid, trifluoromethane sulfonic acid, fluorosulfonic acid, and nitric acid and the like. Preferably, the Bronsted acid catalyst is hydrofluoric acid.

The Lewis acid catalyst may be selected from the group of Lewis acids comprising aluminum trichloride, aluminum tribromide, aluminum triiodide, boron trifluoride, boron tribromide, boron triiodide and the like. Preferably, the Lewis acid catalyst is aluminum trichloride.

The solid acidic catalysts may be selected from a group comprising zeolites, acid clays, and/or silica-alumina. An eligible solid catalyst is a cation exchange resin in its acid form, for example crosslinked sulfonic acid catalyst. The catalyst may be a molecular sieve. Eligible molecular sieves are silica-aluminophosphate molecular sieves or metal silica-aluminophosphate molecular sieves, in which the metal may be, for example, iron, cobalt or nickel. Other suitable examples of solid acidic catalysts are disclosed in U.S. Pat. No. 7,183,452, which is herein incorporated by reference.

The Bronsted acid catalyst may be regenerated after it becomes deactivated (i.e., the catalyst has lost all or some portion of its catalytic activity). Methods that are well known in the art may be used to regenerate the acid catalyst, for example, hydrofluoric acid.

Process for Preparing the Alkylated Aromatic Compound

The alkylation technologies used to produce the primary surfactant alkylate will include Bronsted and/or Lewis acids as well as solid acid catalysts utilized in a batch, semi-batch or continuous process operating at between from about 0 to about 300 degrees Celsius.

The acid catalyst may be recycled when used in a continuous process. The acid catalyst may be recycled or regenerated when used in a batch process or a continuous process.

In one embodiment of the present invention, the alkylation process is carried out by reacting a first amount of at least one aromatic compound or a mixture of aromatic compounds with a first amount of a mixture of olefin compounds in the presence of a Bronsted acid catalyst, such as hydrofluoric acid, in a first reactor in which agitation is maintained, thereby producing a first reaction mixture. The resulting first reaction mixture is held in a first alkylation zone under alkylation conditions for a time sufficient to convert the olefin to aromatic alkylate (i.e., a first reaction product). After a desired time, the first reaction product is removed from the alkylation zone and fed to a second reactor wherein the first reaction product is reacted with an additional amount of at least one aromatic compound or a mixture of aromatic compounds and an additional amount of acid catalyst and, optionally, with an additional amount of a mixture of olefin compounds wherein agitation is maintained. A second reaction mixture results and is held in a second alkylation zone under alkylation conditions for a time sufficient to convert the olefin to aromatic alkylate (i.e., a second reaction product). The second reaction product is fed to a liquid-liquid separator to allow hydrocarbon (i.e., organic) products to separate from the acid catalyst. The acid catalyst may be recycled to the reactor(s) in a closed loop cycle. The hydrocarbon product is further treated to remove excess un-reacted aromatic compounds and, optionally, olefinic compounds from the desired alkylate product. The excess aromatic compounds may also be recycled to the reactor(s).

In another embodiment of the present invention, the reaction takes place in more than two reactors which are located in series. Instead of feeding the second reaction product to a liquid-liquid separator, the second reaction product is fed to a third reactor wherein the second reaction product is reacted with an additional amount of at least one aromatic compound or a mixture of aromatic compounds and an additional amount of acid catalyst and, optionally, with an additional amount of a mixture of olefin compounds wherein agitation is maintained. A third reaction mixture results and is held in a third alkylation zone under alkylation conditions for a time sufficient to convert the olefin to aromatic alkylate (i.e., a third reaction product). The reactions take place in as many reactors as necessary to obtain the desired alkylated aromatic reaction product.

The total charge mole ratio of Bronsted acid catalyst to the olefin compounds is about 1.0 to 1 for the combined reactors. Preferably, the charge mole ratio of Bronsted acid catalyst to the olefin compounds is no more than about 0.7 to 1 in the first reactor and no less than about 0.3 to 1 in the second reactor.

The total charge mole ratio of the aromatic compound to the olefin compounds is about 7.5 to 1 for the combined reactors. Preferably, the charge mole ratio of the aromatic compound to the olefin compounds is no less than about 1.4 to 1 in the first reactor and is no more than about 6.1 to 1 in the second reactor.

Many types of reactor configurations may be used for the reactor zone. These include, but are not limited to, batch and continuous stirred tank reactors, reactor riser configurations, ebulating bed reactors, and other reactor configurations that are well known in the art. Many such reactors are known to those skilled in the art and are suitable for the alkylation reaction. Agitation is critical for the alkylation reaction and can be provided by rotating impellers, with or without baffles, static mixers, kinetic mixing in risers, or any other agitation devices that are well known in the art. The alkylation process may be carried out at temperatures from about 0° C. to about 100° C. The process is carried out under sufficient pressure that a substantial portion of the feed components remain in the liquid phase. Typically, a pressure of 0 to 150 psig is satisfactory to maintain feed and products in the liquid phase.

The residence time in the reactor is a time that is sufficient to convert a substantial portion of the olefin to alkylate product. The time required is from about 30 seconds to about 30 minutes. A more precise residence time may be determined by those skilled in the art using batch stirred tank reactors to measure the kinetics of the alkylation process.

The at least one aromatic compound or mixture of aromatic compounds and the olefin compounds may be injected separately into the reaction zone or may be mixed prior to injection. Both single and multiple reaction zones may be used with the injection of the aromatic compounds and the olefin compounds into one, several, or all reaction zones. The reaction zones need not be maintained at the same process conditions. The hydrocarbon feed for the alkylation process may comprise a mixture of aromatic compounds and olefin compounds in which the molar ratio of aromatic compounds to olefins is from about 0.5:1 to about 50:1 or more. In the case where the molar ratio of aromatic compounds to olefin is >1.0 to 1, there is an excess amount of aromatic compounds present. Preferably an excess of aromatic compounds is used to increase reaction rate and improve product selectivity. When excess aromatic compounds are used, the excess unreacted aromatic in the reactor effluent can be separated, e.g. by distillation, and recycled to the reactor.

Preparation of Alkylaryl Sulfonate

The alkylaromatic product prepared by the process described herein is further reacted to form an alkylaromatic sulfonic acid and then the corresponding sulfonate.

Sulfonation

Sulfonation of the alkylaromatic compound may be performed by any method known to one of ordinary skill in the art. The sulfonation reaction is typically carried out in a continuous falling film tubular reactor maintained at about 45° C. to about 75° C. The alkylaromatic compound is placed in the reactor along with sulfur trioxide diluted with air thereby producing an alkylaryl sulfonic acid. Other sulfonation reagents, such as sulfuric acid, chlorosulfonic acid or sulfamic acid may also be employed. Preferably, the alkylaromatic compound is sulfonated with sulfur trioxide diluted with air. The charge mole ratio of sulfur trioxide to alkylate is maintained at about 0.8 to 1.1:1.

Neutralization of Alkylaromatic Sulfonic Acid

Neutralization of the alkylaryl sulfonic acid may be carried out in a continuous or batch process by any method known to a person skilled in the art to produce alkylaryl sulfonates. Typically, an alkylaryl sulfonic acid is neutralized with a source of alkali or alkaline earth metal or ammonia, thereby producing an alkylaryl sulfonate. Preferably, the source is an alkali metal base; more preferably, the source is an alkali metal hydroxide, such as but not limited to, sodium hydroxide or potassium hydroxide.

The Co-Surfactant

The enhanced oil recovery formulation of the present invention also contains a secondary co-surfactant.

The secondary co-surfactant has the general formula:

$$R_4-SO_3X$$

wherein $R_4$ is an aliphatic hydrocarbyl group having from about 12 to about 40 carbon atoms, and having from about 20 to 98 weight percent branching, and containing one or more olefin or alcohol moieties or mixtures thereof; and X is a mono-valent cation. In one embodiment, X is an alkali metal, ammonium or substituted ammonium.

Examples of substituted ammonium include ammonium independently substituted with from about 1 to about 4 aliphatic or aromatic hydrocarbyl groups having from about 1 to about 15 carbon atoms, such as alkyl, aryl, alkaryl and aralkyl, and optionally having one or more heteroatoms, such as nitrogen, oxygen or sulfur, which may be present in aliphatic or aromatic heterocyclic rings. Examples of suitable heterocyclic ring substituents include pyrrole, pyrrolidine, pyridine, pyrimidine, pyrazole, imidazole and quinoline. The heterocyclic ring substituent may be substituted on the ammonium moiety through a carbon atom in the heterocyclic ring, such as in a C-pyridyl-substituted ammonium, or, alternatively, the quaternary ammonium nitrogen itself may be a nitrogen atom in the heterocyclic ring, such as in a pyridinium ion.

The secondary co-surfactant employed in the present invention is an isomerized olefin sulfonate (IOS) made by the sulfonation of an isomerized alpha olefin (IAO) in which the IAO is made by the isomerization of $C_{12}$-$C_{40}$ normal alpha olefins (NAO), preferably $C_{20}$-$C_{28}$ normal alpha olefins, most preferred $C_{20}$-$C_{24}$ normal alpha olefins.

In one embodiment, $R_4$ is derived from a partially isomerized alpha olefin containing a residual alpha olefin content.

The IAO comprises from about 12 to about 40 carbon atoms, more preferred from about 20 to about 28 carbon atoms and most preferred from about 20 to about 24 carbon atoms.

The IAO is composed of between from about 20 to about 98 wt % branching, preferably from about 45 to about 80 wt % branching and most preferred from about 60 to about 70 wt % branching and between from about 0.1 to about 30 wt % residual alpha olefin, preferably between from about 0.2 to about 20 wt % residual alpha olefin and most preferably between from about 0.5 to about 10 wt % residual alpha olefin species.

In one embodiment, the IAO is composed of at least about 23% branching, at least about 9% residual alpha olefin, and having from about 20 to about 24 carbon atoms.

In another embodiment, the IAO is composed of at least about 65% branching, at least about 0.2-0.5% residual alpha olefin and having from about 20 to about 24 carbon atoms.

In one embodiment, when the percent branching in the partially isomerized alpha olefin is less than or equal to 25 weight percent, then the residual alpha olefin content in such partially isomerized alpha olefin is greater than or equal to 8 weight percent.

In one embodiment, when the percent branching in the partially isomerized alpha olefin is greater than or equal to 15 weight percent, then the residual alpha olefin content in such partially isomerized alpha olefin is less than or equal to 15 weight percent and when the percent branching in the partially isomerized alpha olefin is less than or equal to 15 weight percent, then the residual alpha olefin content in such partially isomerized alpha olefin is greater than or equal to 15 weight percent.

Typically, the normal alpha olefins are isomerized as described hereinabove.

Sulfonation

Sulfonation of the IAO may be performed by any method known to one of ordinary skill in the art to produce an IAO sulfonic acid intermediate. The sulfonation reaction is typically carried out in a continuous falling film tubular reactor maintained at about 30° C. to about 75° C. The charge mole ratio of sulfur trioxide to olefin is maintained at about 0.3 to 1.1:1.

Other sulfonation reagents, such as sulfuric acid, chlorosulfonic acid or sulfamic acid may also be employed. Preferably, the isomerized alpha olefin is sulfonated with sulfur trioxide diluted with air.

The product from the sulfonation process may then be thermally digested by heating.

Neutralization of the Isomerized Alpha Olefin Sulfonic Acid

Neutralization of the IAO sulfonic acid may be carried out in a continuous or batch process by any method known to a person skilled in the art to produce the IOS. Typically, an IAO sulfonic acid is neutralized with a source of alkali metal, ammonium, or substituted ammonium. Preferably, the source is an alkali metal base; more preferably, the source is an alkali metal hydroxide, such as but not limited to, sodium hydroxide or potassium hydroxide.

As noted above, sulfonation of the IAO may be followed by thermal digestion and the resulting product is then neutralized with caustic, and optionally followed by hydrolysis with caustic. The resulting sodium isomerized olefin sulfonate (IOS) is composed of between from about 1 to about 70 wt % alcohol sodium sulfonate. In one embodiment, IOS is composed of between from about 5 to about 35 wt % alcohol sodium sulfonate species with the remainder of the sodium sulfonate species being the sodium olefin sulfonate species. In another embodiment the IOS is composed of between from about 35 to about 60 wt % alcohol sodium sulfonate species with the remainder of the sodium sulfonate species being the sodium olefin sulfonate species.

In one embodiment, the neutralized isomerized alpha olefin sulfonate is further hydrolyzed with caustic.

With regard to M in the primary surfactant and X in the co-surfactant, M and X are independently mono-valent cations, and preferably are independently selected from alkali metal, ammonium and substituted ammonium.

The Solvent

Suitable solvents employed in the present invention are alcohols, such as lower carbon chain alcohols like isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; alcohol ethers, polyalkylene alcohol ethers, polyalkylene glycols, poly(oxyalkylene)glycols, poly(oxyalkylene)glycols ethers or any other common organic solvent or combinations of any two or more solvents.

The Passivator

Typically, the passivator employed in the present invention is an alkali metal salt. Preferably, the alkali metal salt is a base, such as an alkali metal hydroxide, carbonate or bicarbonate, including, but not limited to, sodium carbonate, sodium bicarbonate, sodium hydroxide, potassium hydroxide, lithium hydroxide and the like.

The Polymer

Polymers, such as those commonly employed for enhanced oil recovery, may be included to control the mobility of the injection solution. Such polymers include, but are not limited to, xanthan gum, partially hydrolyzed polyacrylamides (HPAM) and copolymers of 2-acrylamido-2-methylpropane sulfonic acid and/or sodium salt and polyacrylamide (PAM) commonly referred to as AMPS copolymer. Molecular weights ($M_w$) of the polymers range from about 10,000 daltons to about 20,000,000 daltons. Polymers are used in the range of about 500 to about 2500 ppm concentration, preferably from about 1000 to 2000 ppm in order to match or exceed the reservoir oil viscosity under the reservoir conditions of temperature and pressure.

Enhanced Oil Recovery Surfactant Formulation

The enhanced oil recovery surfactant formulation used in the recovery of oil in reservoirs, by the use of surfactant flooding techniques, comprises a primary surfactant, a secondary co-surfactant, a solvent, a passivator and a polymer in an aqueous solution. Typically, the aqueous solution comprises from about 500 to about 10,000 ppm total dissolved solids.

Preferably, the formulation of the EOR surfactant comprises from about 0.5 to about 4.0 weight percent actives of the primary surfactant, from about 0.1 to 3.0 weight percent actives of the secondary co-surfactant, from about 0.5 to about 6.0 weight percent of the solvent, from about 0.3 to about 1.0 weight percent of the passivator and from about 500 to 4000 ppm of the polymer, all of which are in an aqueous solution containing from about 500 to about 10,000 ppm total dissolved solids.

More preferred, the formulation of the EOR surfactant comprises from about 1.0 to about 3.0 wt % actives of the primary surfactant, from about 0.3 to about 2.0 wt % actives of the secondary surfactant, from about 1.0 to about 4.0 wt % of the solvent, from about 0.5 to about 0.85 wt % of the passivator and from about 1000 to about 3000 ppm of the polymer, all of which are in an aqueous solution containing from about 1000 to about 10,000 ppm total dissolved solids.

Most preferred, the formulation of the EOR surfactant comprises about 1.5 wt % actives of the primary surfactant, about 0.5 wt % actives of the secondary co-surfactant, about 3 wt % of a solvent, about 0.85 wt % of a passivator and about 1500 ppm of a polymer, all of which are in an aqueous solution containing from about 1000 to about 10,000 ppm total dissolved solids.

Process of Making the Enhanced Oil Recovery Surfactant Formulation

The enhanced oil recovery surfactant formulation of the present invention is prepared by a process of mixing (a) a primary surfactant having the general formula:

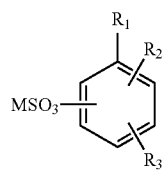

wherein $R_1$ is hydrogen or an alkyl group containing from about 1 to 3 carbon atoms; $R_2$ is hydrogen or an alkyl group having from about 1 to about 3 carbon atoms; $R_3$ is an alkyl group having from about 8 to about 60 carbon atoms, and M is a mono-valent cation;

(b) a secondary co-surfactant having the general formula:

wherein $R_4$ is an aliphatic hydrocarbyl group having from about 12 to about 40 carbon atoms, and having from about 20 to 98 weight percent branching, and containing one or more olefin or alcohol moieties or mixtures thereof; and X is a mono-valent cation;

(c) a solvent;
(d) a passivator; and
(e) a polymer.

Other embodiments will be obvious to those skilled in the art.

The following examples are presented to illustrate specific embodiments of this invention and are not to be construed in any way as limiting the scope of the invention.

Example 1

Blend of Primary Surfactant, Secondary Surfactant and Ethyleneglycol Mono n-Butyl Ether To a 500 ml beaker fitted with a mechanical stirrer and a thermocouple connected to a hot plate was added 85.0 grams of the primary surfactant from Example 4 followed by 31.3 grams of the secondary surfactant from Example 7 with stirring (500 rpm) at 40° C. To this stirring solution was then added 133.7 grams of ethyleneglycol mono n-butyl-ether (obtained from Eastman Chemical company) and the resulting mixture was maintained at 40° C. and stirred as above for 30 minutes and cooled to room temperature. This mixture had the following composition and properties: 26.8 wt % active primary surfactant, 8.9 wt. % active secondary surfactant and 53.5 wt. % ethylene glycol n-butyl-mono ether; Viscosity=23.6 cSt (40° C.), 12.7 cSt (60° C.), 4.04 cSt (100° C.), Specific gravity (15° C. or 59° F.)=0.97, Density=0.95 gm/ml at 40° C., Density=8.1 lbs/gallon at 15° C., Water content approximately 4-5 wt. %, pH (1 wt. % in water at room temperature) approximately 9.0, Flashpoint=73° C. (ASTM D93, PMCC).

Example 2

Preparation of Alkyl Ortho-Xylene Alkylate

To a 4 liter, glass reactor fitted with a mechanical stirrer, thermocouple, solids addition funnel, 1 liter addition funnel and an ice water cooling bath was added 1000 grams (9.4 moles) of ortho-xylene. To the reactor was then added 56.0 grams (0.42 moles) of solid aluminium trichloride followed by 7 grams (0.39 moles) of deionized water while maintaining the reactor temperature at about 24° C. To 550.6 grams (approximately 2.09 moles) of a normal alpha-olefin (NAO) mixture containing the following percentages of NAO fractions obtained from Chevron Phillips Company:

| NAO Fraction | Weight % |
|---|---|
| C12 | 4.4 |
| C14 | 25.6 |
| C16 | 19.4 |
| C18 | 14.3 |
| C20-24 | 22.5 |
| C24-28 | 8.7 |
| C30+ | 5.1 |

This NAO blend contained the following carbon number distribution calculated from the carbon number distribution present in each of the NAO fractions:

| Carbon Number | Weight Percent |
|---|---|
| C12 | 4.5 |
| C14 | 25.5 |
| C16 | 19.5 |
| C18 | 14.5 |
| C20 | 9.0 |
| C22 | 8.0 |
| C24 | 6.5 |
| C26 | 3.5 |
| C28 | 3.0 |
| C30+ | 6.0 |

To approximately half of this warm (65° C.) NAO blend was added approximately 60 grams of room temperature (25° C.) ortho-xylene. This NAO/ortho-xylene mixture of was charged to the addition funnel and then added to the reactor dropwise with stirring (approximately 250 rpm) over 57 minutes while maintaining the reactor temperature between approximately 15-18° C. with the ice cooling bath. To the remaining warm (65° C.) NAO blend was added approximately 60 grams of room temperature (25° C.) ortho-xylene and charged to the addition funnel and then then added to the reactor dropwise over 30 minus while maintaining the reactor temperature between approximately 15-18° C. with the ice cooling bath. The reaction was held between approximately 15-18° C. for 1 hour with the ice cooling bath and then quenched by pouring the reactor contents into approximately 500 grams of ice in a 4 liter beaker. The contents of the beaker were stirred manually with a stirring rod and then approximately 150 grams of 50 wt. % aqueous sodium hydroxide was added to the beaker with manual stirring. When a white color persisted in the beaker, the contents of the beaker were transferred to a separatory funnel and the water layer was separated. The organic layer was then washed with water until the washings were neutral and then organic layer was dried over anhydrous $MgSO_4$, gravity filtered and the excess ortho-xylene removed by distillation (1-10 mm Hg vacuum and at approximately 85° C.) to afford 617.2 grains of alkyl-xylene alkylate. This reaction was repeated three more times which afforded 638.8, 665.8 and 654.5 grams each of alkyl-xylene alkylate. The four alkyl-xylene alkylates were combined and found to have the following properties: Bromine Index=233; 2-Alkyl Attachment=51.6%, Di-Alkylate=7.2% and by Infrared spectroscopy, only 1,2,4-tri-substitution on the aromatic ring.

Example 3

Sulfonation of Alkyl-Xylene Alkylate

The alkyl-xylene alkylate from example 2 was sulfonated in a glass, water jacketed, falling film tubular reactor (0.6 cm ID and three reactors in series, R1=30 cm, R2=30 cm and R3=70 cm) using SO3/Air and the following conditions:

IAO Feed Temperature=50° C.
Reactor Temperature=55° C.
Air Flow=192 liters/hr
SO2 Flow=16 liters/hr
SO2 to SO3 conversion=87%
Alkylate Feed Rate=3.8 g/minutes
Charge Molar Ratio of SO3/Alkylate=1.00

In two separate sulfonation runs, the resulting alkyl ortho-xylene sulfonic acid obtained had the following properties: 95.7 and 88.0% SO3H, 1.46 and 0.9% H2SO4, respectively. The resulting ortho-xylene sulfonic acid was digested at room temperature for about 24 hours.

Example 4

Neutralization of Alkyl-Xylene Sulfonic Acid

The alkyl ortho-xylene sulfonic acids produced in Example 3 were neutralized in three separate batches (929, 530 and 589 grams of alkyl ortho-xylene sulfonic acid each) in a 4 liter beaker by adding 50 wt. % aqueous sodium hydroxide to the alkyl ortho-xylene sulfonic acid (162.1, 103 and 114.9 grams, respectively) while maintaining the temperature of the reaction between 40° C. and 66° C. with vigorous mechanical stirring (approximately 1500 rpm). The amount of aqueous sodium hydroxide added was sufficient to complete the neutralization. The resulting sodium alkyl ortho-xylene sulfonates were combined to afford the primary surfactant with the following properties: Activity (Hyamine titration)=75.9%; Molecular Weight (weight average determined by electrospray ionization mass spectrometry)=444; pH=9.7 (measured on an approximately 1 wt % aqueous solution of the sodium alkyl ortho-xylene sulfonate with a calibrated pH electrode).

Example 5

Isomerization of C20-24 Normal Alpha Olefin

The primary olefinic species in Normal Alpha Olefins (NAO's) is normally alpha-olefin. The isomerization of NAO's over the solid acid extrudate catalyst ICR 502 (purchased from Chevron Lummnus Global) isomerizes the alpha-olefin to other olefinic species, such as beta-olefins, internal olefins and even tri-substituted olefins. The isomerization of NAO's over ICR 502 catalyst also induces skeletal isomerization in which methyl groups are introduced along the hydrocarbon chain of the isomerized alpha olefin (IAO) which is referred to as branching. Both the alpha-olefin and branching content of IAO's is conveniently monitored by Infrared spectrometry (the alpha olefin C—H stretch band is at approximately 907 cm-1 and the methyl —$CH_3$ stretch band is at approximately 1378 cm-1) by attenuated reflectance (ATR) infrared spectrometry. A calibration curve was developed between the infrared absorption value at 907 cm-1 and the percent alpha-olefin determined by quantitative carbon NMR to allow the quantitative determination of the amount of residual alpha olefin present in an IAO sample by ATR infrared spectrometry. Similarly, a calibration curve was developed between the infrared absorption value at 1378 cm-1 and the percent branching determined by GLPC analysis of the corresponding hydrogenated IAO samples (hydrogenation converts the IAO to a mixture of paraffin's in which the normal paraffin has the longest retention time for a give carbon number) to allow the quantitative determination of the amount of methyl branching present in an IAO sample by ATR infrared spectrometry.

The isomerization of C20-24 NAO (obtained from Chevron Phillips Company) was achieved in an up-flow, steel fixed bed reactor (10/1 length to diameter ratio) fitted with a support grid and screen at the bottom and filled with approximately 10 cm of inert balls (3 mm in diameter) on the bottom of the reactor followed by approximately 235 kg of ICR 502 and then approximately 20 cm of a mixture of inert balls (3 mm and 10 mm in diameter). The C20-24 NAO feed was heated through a heat exchanger such that at the inlet of the reactor, the feed temperature was between 203-206° C. at a flow rate averaging approximately 178 liters/hr (a Weight Hourly Space Velocity of approximately 0.6) over 36 hours to produce 6308 liters of IAO with the following properties: 67.7% Branching and 0.4% residual alpha-olefin by ATR Infrared spectroscopy; Alpha-olefin=0%, Beta-olefin=39%, Internal-olefin=25%, Tri-Substituted-olefin=35% by quantitative carbon NMR; viscosity=2.2 cSt (100° C.), 6.36 cSt (40° C.); Density=0.7831 (50° C.); Pour Point=−8° C.; Flash Point=80.2° C. (ASTM PMCC); Water=32.4 ppm; C18 and lower=1.1%, C20=38.3%, C22=32.7%, C24=19.9, greater than and equal to C26=8.0% by GLPC and SFC.

Example 6

Sulfonation of IAO and Neutralization of IAO Sulfonic Acid

The Isomerized C20-24 alpha-olefin (IAO) from Example 5 was sulfonated in a vertical, falling film reactor (water jacketed stainless steel, 0.6 inch ID, 5 feet long) using concurrent SO3/Air down flow, a cyclone separator where a portion of the acid is cooled acid and recycled to the bottom of the falling film reactor. The crude acid is optionally digested by passing through a water jacked, plug flow vessel at 40° C. and neutralized by the addition of 50 wt. % aqueous NaOH by means of tee inlet followed by passing the neutralized acid through a high sheer mixer at 85-90° C. The following sulfonation, digestion and neutralization conditions were used:

| | |
|---|---|
| Air/$SO_3$ Temperature, ° C. | 38 |
| IAO Feed Temperature, ° C. | 25 |
| Reactor Temperature, ° C. | 30 |
| $SO_3$ in Air Concentration, Vol % | 2.5 |
| $SO_3$ Reactor Loading, kg/hr-cm | 0.777 |

| | | FLOWRATES | |
|---|---|---|---|
| MR $SO_3$/IAO | Digestion Time (minutes) | $SO_3$ kg/hr | IAO Feed kg/hr |
| 1.0 | none | 3.72 | 13.978 |

The following properties of the intermediate isomerized alpha olefin sulfonic acid (IAO Sulfonic Acid) and the corresponding sodium salt (IOS Sodium Salt) following neutralization were obtained:

| | IAO Sulfonic Acid Properties | | | Sodium IOS Properties | | | |
|---|---|---|---|---|---|---|---|
| | | | Hyamine | Hydroxy | | | |
| RSO3H (%) | H2SO4 (%) | Acid Number (mg KOH/gm of Sample | Activity (%) (1) | Sulfonate (%) (2) | pH (3) | Free Base (%) | |
| 60.9 | 2.1 | 113.5 | 70.4 | 25.7 | 9.7 | 0.77 | |

(1) Calculated using the weight average molecular weight determined by electro-spray ionization mass spectrometry (ESI-MS).
(2) Determined by electro-spray ionization mass spectrometry (ESI-MS).
(3) Determined on approximately a 1 wt. % sodium IOS in water using a calibrated (pH 7 and 10) pH electrode.

Example 7

Hydrolysis of Neutralized Sodium Isomerized Olefin Sulfonate

The sodium IOS obtained following neutralization was then subjected to batch hydrolysis. In a typical experiment, 668.2 grams of sodium IOS was transferred to a steel pressure reactor (Parr Model 4540—600 ml capacity equipped with a Parr Model 4843 temperature controller) followed by 22.3 grams of 50 wt. % aqueous sodium hydroxide. The reactor was sealed and the reactor temperature was set to 120° C. and agitation begun. The temperature of the reactor typically was around approximately 20° C. and increased to about 118° C. over approximately 45 minutes to 1 hour. The reaction was stirred at typically 118° C. for 30 minutes and the reactor was cooled to approximately 90° C. to 95° C. with an ice bath. The reactor was vented to the atmosphere, the reactor top was removed and the contents of the reactor were removed with the aid of a spatula to afford 677 grams of the secondary surfactant. This hydrolysis reaction was repeated 7 more times to afford 5.3 kg of the secondary surfactant with the following properties: Molecular Weight=409 (weight average determined by electro-spray ionization mass spectrometry); Activity=71.9% (Hyamine titration), Hydroxy Sulfonate Content=27.7% (by electro-spray mass spectrometry; pH=10.5; Free Base=1.44% (by HCl titration).

Example 8

Core Flood Testing

The primary surfactant of Example 4 in combination with the secondary surfactant of Example 7 were tested for core flood performance according to the following reference (Jackson, A. C.: "Experimental Study of the Benefits of Sodium Carbonate on Surfactants for Enhanced Oil Recovery," M. S. Thesis, The University of Texas at Austin, December 2006; Identification and Evaluation of High-Performance EOR Surfactants, D. B. Levitt, SPIE, A. C. Jackson, SPIE, C. Heinson, SPE, and L. N. Britton, U. of Texas at Austin; T. Malik and Y. Dwarakanath, SPE, Intera Inc.; and G. A. Pope, SPE, U. of Texas at Austin, SPE 100089, 2006) using the following sequence of materials: Surfactant Slug, Drive 1 and Drive 2:

| Component | Source | Concentration |
|---|---|---|
| Surfactant Slug | | |
| Primary Surfactant | Example 4 | 1.5 wt. % Active |
| Secondary Surfactant | Example 7 | 0.5 wt. % Active |
| Co-Solvent | Ethylene Glycol n-Butyl Mono Ether | 3.0 wt. % |
| Passivator | $Na_2CO_3$ | 0.85 wt. % |
| Polymer | AN 125 | 1500 ppm |
| Drive 1 | | |
| Co-Solvent | Ethylene Glycol n-Butyl Mono Ether | 1.5 wt. % Active |
| Passivator | $Na_2CO_3$ | 0.5 wt. % Active |
| Polymer | AN 125 | 2000 ppm |
| Drive 2 | | |
| Polymer | AN 125 | 1600 ppm |

The composition of the synthetic brine water used to make up the remainder of the mass in the Surfactant Slug, Drive 1 and Drive 2 was as follows:

Synthetic Brine Composition:

| | |
|---|---|
| Sodium | 900 mg/L |
| Calcium | 20 mg/L |
| Iron | 0 mg/L |
| Potassium | 15 mg/L |
| Chloride | 800 mg/L |
| Sulfate | 18 mg/L |
| Bicarbonate | 1100 mg/L |
| Total Dissolved Solids: | 2858 mg/L |

The Synthetic Brine Recipe:

| | |
|---|---|
| Calcium chloride, dihydrate ($CaCl_2$—$2H_2O$) | 73 mg/L |
| Magnesium Chloride, hexahydrate ($MgCl_2$—$6H_2O$) | 42 mg/L |
| Sodium Chloride, NaCl | 1,214 mg/L |
| Sodium Sulfate, $Na_2SO_4$ | 27 mg/L |
| Sodium Bicarbonate, $NaHCO_3$ | 1,515 mg/L |
| Potassium Chloride, KCl | 29 mg/L |
| Total Dissolved Solids: | 2858 mg/L |

The salts used to make up the solutions need to be dry. Dilution is with deionized water. Before adding the calcium salt, adjust the pH to about 7.35 by bubbling CO2 through the solution. Keep container closed.

The AN 125 polymer used is a commercially available 2-acrylamido-2-methyl propane sulfonate. AN 125 may be purchased from SNF Floerger (Andrézieux-Boutheon, France).

The core material was Briar Hill, square, 1' length mounted horizontal placed in plastic mold and held together with duct tape and clamps to prevent leakage. The oil used was crude oil obtained from the Minas field on the island of Sumatra in Indonesia. The core was oil flooded and then water flooded using synthetic brine until no further oil was produced before the Surfactant Slug (30.98 mls) and Drives 1 and 2 were used (all at 85° C.). The cumulative oil recovery from the core was 85% after 1.4 core volumes of total material (30.98 ml of Surfactant Slug followed by Drive 1 and Drive 2) were pumped through the core.

What is claimed is:

1. An enhanced oil recovery formulation comprising
   (a) a primary surfactant comprising an alkylaromatic moiety having the general formula:

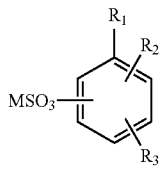

wherein $R_1$ is hydrogen or an alkyl group containing from about 1 to 3 carbon atoms; $R_2$ is hydrogen or an alkyl group having from about 1 to 3 carbon atoms; $R_3$ is an alkyl group having from about 8 to about 60 carbon atoms and M is a mono-valent cation;
   (b) a secondary co-surfactant having the general formula:

wherein $R_4$ is an aliphatic hydrocarbyl group having from about 12 to about 40 carbon atoms, and having from about 20 to 98 weight percent branching, and containing one or more olefin or alcohol moieties or mixtures thereof; and X is a mono-valent cation;
   (c) a solvent;
   (d) a passivator; and
   (e) a polymer.

2. The enhanced oil recovery formulation of claim 1, wherein $R_1$ and $R_2$ are methyl and the alkylaromatic moiety is alkylxylene.

3. The enhanced oil recovery formulation of claim 2, wherein the alkylxylene moiety is alkyl-ortho-xylene.

4. The enhanced oil recovery formulation of claim 1, wherein $R_4$ is derived from a partially isomerized alpha olefin containing a residual alpha olefin content.

5. The enhanced oil recovery formulation of claim 4, wherein when the percent branching in the partially isomerized alpha olefin is less than or equal to 25 weight percent, then the residual alpha olefin content in such partially isomerized alpha olefin is greater than or equal to 8 weight percent.

6. The enhanced oil recovery formulation of claim 4, wherein the isomerized alpha olefin contains at least about 23 wt % branching, at least about 9% residual alpha olefin, and has from about 20 to about 24 carbon atoms.

7. The enhanced oil recovery formulation of claim 1, wherein the mono-valent cation in the primary surfactant is an alkali metal, ammonium or substituted ammonium.

8. The enhanced oil recovery formulation of claim 7, wherein the alkali metal is sodium.

9. The enhanced oil recovery formulation of claim 8, wherein $R_3$ is an alkyl group derived from olefins having from about 12 to about 40 carbon atoms.

10. The enhanced oil recovery formulation of claim 1, wherein $R_1$, $R_2$, and $R_3$ are all alkyl and wherein the alkylaromatic moiety has at least 90 wt % of a 1,3,4-tri-alkyl aromatic ring attachment structure.

11. The enhanced oil recovery formulation of claim 10, wherein the 1,3,4-aromatic ring attachment structure is such that the longest alkyl chain on the aromatic ring has 40 to 60 wt % 2-alkyl attachment to the aromatic ring.

12. The enhanced oil recovery formulation of claim 1, wherein $R_3$ is an alkyl group derived from olefins having from about 10 to about 50 carbon atoms.

13. The enhanced oil recovery formulation of claim 1, wherein the mono-valent cation in the secondary cosurfactant is an alkali metal, ammonium or substituted ammonium.

14. The enhanced oil recovery formulation of claim 1, wherein the solvent is an alcohol, ether alcohol, polyether alcohol, glycol or polyether glycol.

15. The enhanced oil recovery formulation of claim 14, wherein the base is an alkali metal hydroxide, alkali metal carbonate or alkali metal bicarbonate.

16. The enhanced oil recovery formulation of claim 1, wherein the passivator is a base.

17. The enhanced oil recovery formulation of claim 1, wherein the polymer is PAM, HPAM or AMPS.

18. The enhanced oil recovery formulation of claim 1, wherein $R_4$ has from about 20 to about 28 carbon atoms and has from about 45 to 80 weight percent branching, and contains a mixture of olefin and alcohol moieties.

19. The enhanced oil recovery formulation of claim 1, wherein the polymer is present in a concentration of from about 500 ppm to about 3000 ppm based on the total weight of the formulation.

20. The enhanced oil recovery formulation of claim 1, wherein the isomerized alpha olefin contains at least about 65% branching, at least about 0.2% residual alpha olefin and has from about 20 to about 24 carbon atoms.

21. The enhanced oil recovery formulation of claim 1, wherein if the percent branching in the partially isomerized alpha olefin is greater than or equal to 15 weight percent, then the residual alpha olefin content in such partially isomerized alpha olefin is less than or equal to 15 weight percent and wherein if the percent branching in the partially isomerized alpha olefin is less than or equal to 15 weight percent, then the residual alpha olefin content in such partially isomerized alpha olefin is greater than or equal to 15 weight percent.

22. A method of making an enhanced oil recovery formulation comprising mixing
   (a) a primary surfactant comprising an alkylaromatic moiety having the general formula:

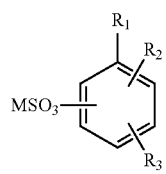

wherein $R_1$ is hydrogen or an alkyl group containing from about 1 to 3 carbon atoms; $R_2$ is hydrogen or an alkyl group having from about 1 to about 3 carbon atoms; $R_3$ is an alkyl group having from about 8 to about 60 carbon atoms, and M is a mono-valent cation;
   (b) a secondary co-surfactant having the general formula:

wherein $R_4$ is an aliphatic hydrocarbyl group having from about 12 to about 40 carbon atoms, and having from about 20 to 98 weight percent branching, and containing one or more olefin or alcohol moieties or mixtures thereof; and X is a mono-valent cation;
   (c) a solvent;
   (d) a passivator; and
   (e) a polymer.

* * * * *